United States Patent
Yokoyama et al.

(10) Patent No.: US 12,423,385 B2
(45) Date of Patent: Sep. 23, 2025

(54) AUTOMATIC CLASSIFICATION OF MESSAGES BASED ON KEYWORDS

(71) Applicant: Lenovo (Singapore) Pte. Ltd., Singapore (SG)

(72) Inventors: Ojuro Yokoyama, Kawasaki (JP); Hiroyuki Sumi, Hadano (JP); Noritoshi Yoshiyama, Yokohama (JP); Anatassios Markas, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/487,425

(22) Filed: Oct. 16, 2023

(65) Prior Publication Data
US 2025/0124111 A1 Apr. 17, 2025

(51) Int. Cl.
*G06F 18/24* (2023.01)
*G06F 18/2413* (2023.01)

(52) U.S. Cl.
CPC .. *G06F 18/24147* (2023.01); *G06F 18/24765* (2023.01)

(58) Field of Classification Search
USPC ......................................................... 707/737
See application file for complete search history.

(56) References Cited

U.S. PATENT DOCUMENTS

| | | | | |
|---|---|---|---|---|
| 5,377,354 A | * | 12/1994 | Scannell | H04L 51/42 706/45 |
| 8,903,752 B1 | * | 12/2014 | Pacovsk | G06Q 10/063 709/202 |
| 10,621,507 B2 | * | 4/2020 | Venkataraman | G06F 16/3325 |
| 11,368,423 B1 | * | 6/2022 | Plater-Zyberk | G06Q 30/0631 |
| 11,720,842 B2 | * | 8/2023 | Galginaitis | G06N 7/01 705/7.39 |

(Continued)

OTHER PUBLICATIONS

Pelleg, Dan, "X-means: Extending K-means with Efficient Estimation of the Number of Clusters", 8 pgs.

(Continued)

*Primary Examiner* — Belix M Ortiz Ditren
(74) *Attorney, Agent, or Firm* — Schwegman Lundberg & Woessner, P.A.

(57) ABSTRACT

Electronic communications and a keyword are provided to a machine learning algorithm. Similarity measures are received from the machine learning algorithm. The similarity measures indicate a similarity between the communications and the keyword. The communications are clustered as a function of the similarity measures. False positive communications are removed from a first cluster as a function of a sum of distances between the false positive communication and communications in the first cluster that include the keyword and a sum of distances between the false positive communication and communications in the first cluster that do not include the keyword. False negatives are added to the first cluster as a function of a sum of distances between the false negative and communications in the first cluster that include the keyword and the sum of distances between the false negative and communications in the cluster that do not include the keyword.

18 Claims, 6 Drawing Sheets

(56) References Cited

U.S. PATENT DOCUMENTS

2005/0060643 A1* 3/2005 Glass ................... H04L 51/212
　　　　　　　　　　　　　　　　　　　　　　715/205
2018/0300315 A1* 10/2018 Leal ..................... G06F 40/268

OTHER PUBLICATIONS

Peng, Sancheng, "A survey on deep learning for textual emotion analysis in social networks", Digital Communications and Networks 8 (2022) 745-762, (Oct. 14, 2021), 18 pgs.

* cited by examiner

AUTOMATIC CLASSIFICATION OF MESSAGES BASED ON KEYWORDS

TECHNICAL FIELD

Embodiments described herein generally relate to the automatic classification of messages based on keywords, and in an embodiment, but not by way of limitation, the automatic classification of messages based on keywords using a machine learning algorithm.

BACKGROUND

Typical business personnel receive large amounts of messages in the form of emails, chats, and other electronic messages. Most of these persons do not have the time to sort and organize these messages into proper categories, folders, and/or files, such as organizing these communications by individual projects in the business. Conventional machine learning could be used to classify these messages, but conventional machine learning techniques need to create specialized models for each user to understand which messages belong to specific projects or categories. This approach requires a large amount of data, supervised learning from each user, and a significant amount of local processing. For these reasons, conventional approaches are not practical.

Currently, Long/Short-term Memory (LSTM) and Transformer neural networks are the main methods used to classify documents. Similarly, however, these methods require a set of original sentences and their labels as training data. These methods may work well in classifying Internet articles since there are plenty of data to identify those articles along with the proper labels. However, it is not practical to prepare a classifier specific to an individual because a large set of training data and processing resources for training are required to prepare a single classifier.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
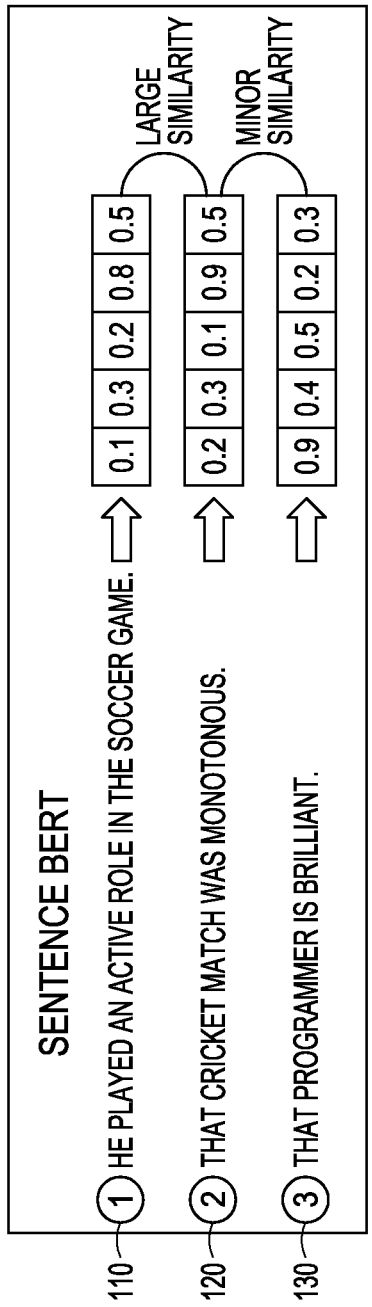
FIG. 1 illustrates a result of a Sentence BERT (Bidirectional Encoder Representations from Transformers) operation.

Based on the difficulties noted above in classifying electronic communications, there is a need to automatically classify messages into projects or other categories based on their natural language content. An embodiment combines a keyword search and machine learning frameworks that can understand the meaning of ambiguous language such as Sentence BERT (Bidirectional Encoder Representations from Transformers) to perform project-specific (and other) classifications for company projects without the need of creating training data for each user. FIG. 1 illustrates an example result of a Sentence BERT operation. Sentence 110 and sentence 120 are similar, and therefore receive higher similarity scores. However, sentence 130 is not similar to either sentence 110 or sentence 120, and therefore receives lower similarity scores.

Based on a set of project keywords, a keyword search is applied on a BERT-class model. A sentence BERT model that converts sentences into vectors can be used. The distance between those vectors is used to determine the degree of relevance between various sentences. In other words, if the relevance between two sentences is high, the two vectors will be close. If the relevance between two sentences is low, the two vectors will be far apart. Using this property, targeted classification is achieved using already trained models and inferences.

An embodiment can pick up related electronic communications by combining Sentence BERT and a keyword search. This process achieves individual-specific classifications and local processing that was not previously possible. Also, the embodiment can exclude unrelated electronic communications by combining Sentence BERT, which can quantify sentences, with clustering, and this process detects sentences with weak relevance to the project.

Figure 2:
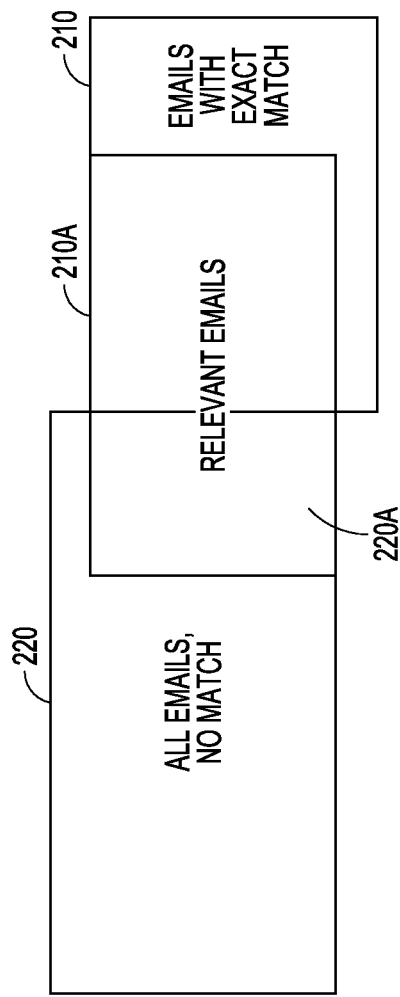
FIG. 2 is a Venn-like diagram of the results of a keyword search of electronic communications.

The relevance of an electronic communication is calculated in a unique way. First, a user specifies at least one keyword related to a particular project (or other subject). The algorithm looks at all user messages (i.e., emails, chats, etc.) and classifies them into different sections. A Venn-like diagram, as is illustrated in FIG. 2, is created of the emails (or other electronic communications) detected by the keyword search and the emails related to the project. The projects section 220 of the Venn-like diagram contains typos, other relevant keywords to the project, and other emails that are relevant but do not include the project keyword(s). The keyword search can also identify messages that may contain the keyword, but they are not related to the project, and are represented by section 210. Based on the characteristics of each area, false positives in section 210 are detected by X-means and false negatives in section 220 are detected by conditional probability represented by a Gaussian function. Section 220A represents the false negatives that should have been classified as a positive and section 210A represents the false positives that should have been classified as a negative.

The algorithm functions as follows. A keyword search is performed for the entire electronic communication using registered words such as a project name. Since the sentence BERT creates a similarity metric between two sentences, it is expected that the extraction results will contain errors. The reason for this is that the second sentence is just a single project keyword instead of a sentence.

As noted above in the discussion of FIG. 2, there are two types of errors. One type of error is a false negative in the keyword search. False negatives are electronic communications that are related to the project, but they were not detected by the keyword search. Keywords may not have been included, for example, because there was a typo of the keyword in the electronic communication, there was a use of a different project name, and there may have been a discussion of the project but without using the project name keyword.

The other type of error is a false positive. These are electronic communications that were detected by the keyword search, but they are not related to the project. The keyword may have appeared in the electronic communication for one or more of the following reasons. For example, the project name may have been included in the electronic communication, but the project was not the main topic of the communication (i.e., the reference of the project was only as it relates to a different project). As another example, the project name could appear in the electronic communication, but is not relevant to the discussion (e.g., discussing only a social event for the project team).

The outliers for false positives are detected from electronic communications by a keyword search to detect false positives with low relevance. By doing this, false positives with low relevance can be reduced in subsequent steps. An X-means process can be used for outlier detection. For false negatives, proximity data detection is used. The data from which outliers are excluded from the keyword-detected data are used. Data near these data will be considered relevant to the project.

The following flow process is used to calculate probabilities according to the proximity. As an initial value, the data of the false positives are set to a probability of 0.95, and all others to 0.05. The reason for not setting it completely to 0 is to provide a buffer against mislabeling with label smoothing.

Figure 3:
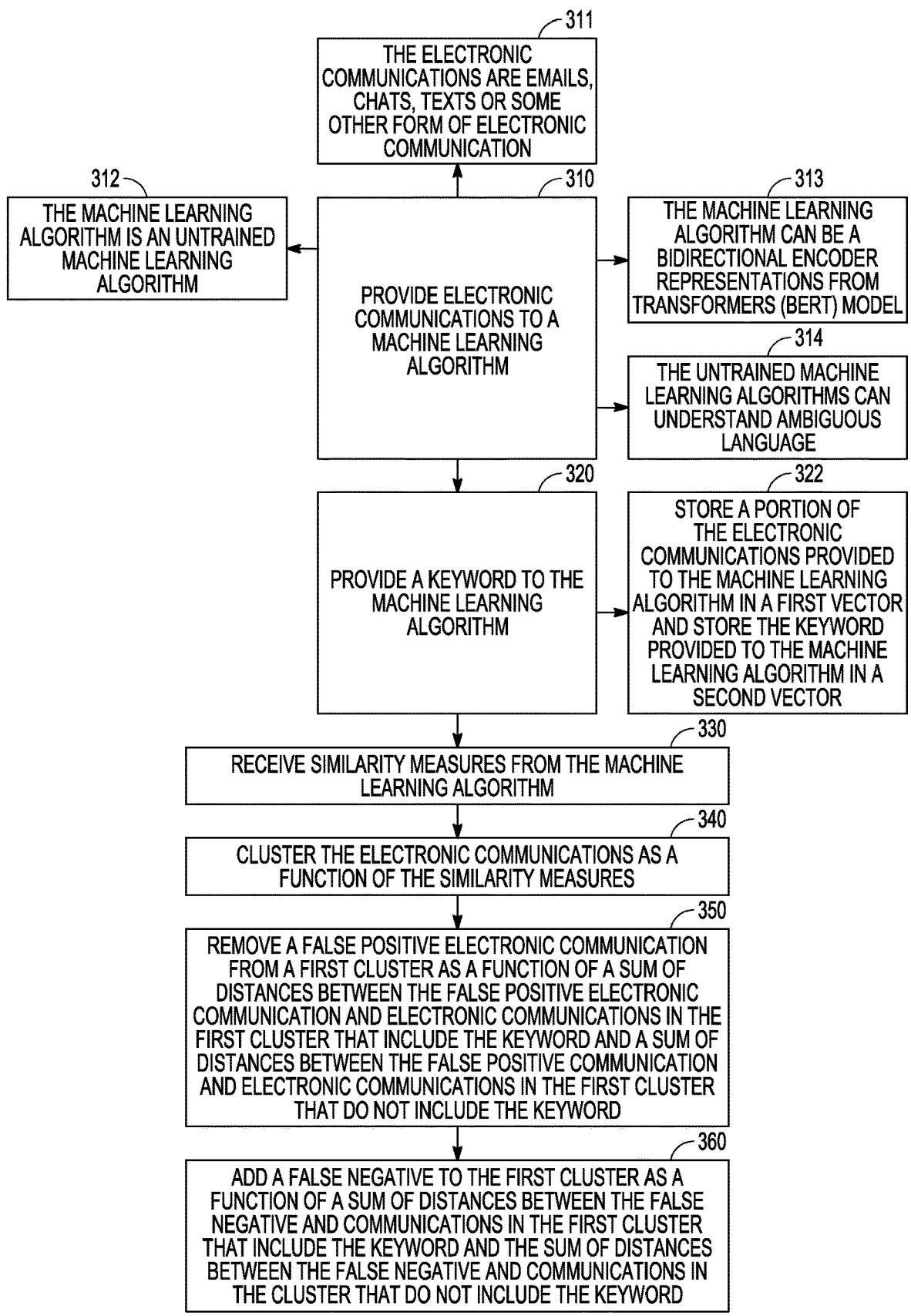
FIG. 3 is a block diagram illustrating operations and feature of a system and process to classify electronic communications.

FIG. 3 is a more detailed block diagram illustrating example embodiments of a system and process for automatically classifying messages based on keywords. FIG. 3 includes a number of process and feature blocks 310-360. Though arranged substantially serially in the example of FIG. 3, other examples may reorder the blocks, omit one or more blocks, and/or execute two or more blocks in parallel using multiple processors or a single processor organized as two or more virtual machines or sub-processors.

Referring now specifically to FIG. 3, at 310, electronic communications are provided to a machine learning algorithm. The electronic communications can be emails, chats, texts or some other form of electronic communication (311). As indicated at 312, the machine learning algorithm can be an untrained machine learning algorithm. As further indicated at 313, the machine learning algorithm can be a bidirectional encoder representations from transformers (BERT) model. Such untrained machine learning algorithms can understand ambiguous language (314).

At 320, a keyword is provided to the machine learning algorithm. As indicated at 322, a portion of the electronic communications provided to the machine learning algorithm can be stored in a first vector and the keyword provided to the machine learning algorithm can be stored in a second vector.

At 330, similarity measures are received from the machine learning algorithm. The similarity measures indicate a similarity between the electronic communications and the keyword.

Figure 4:
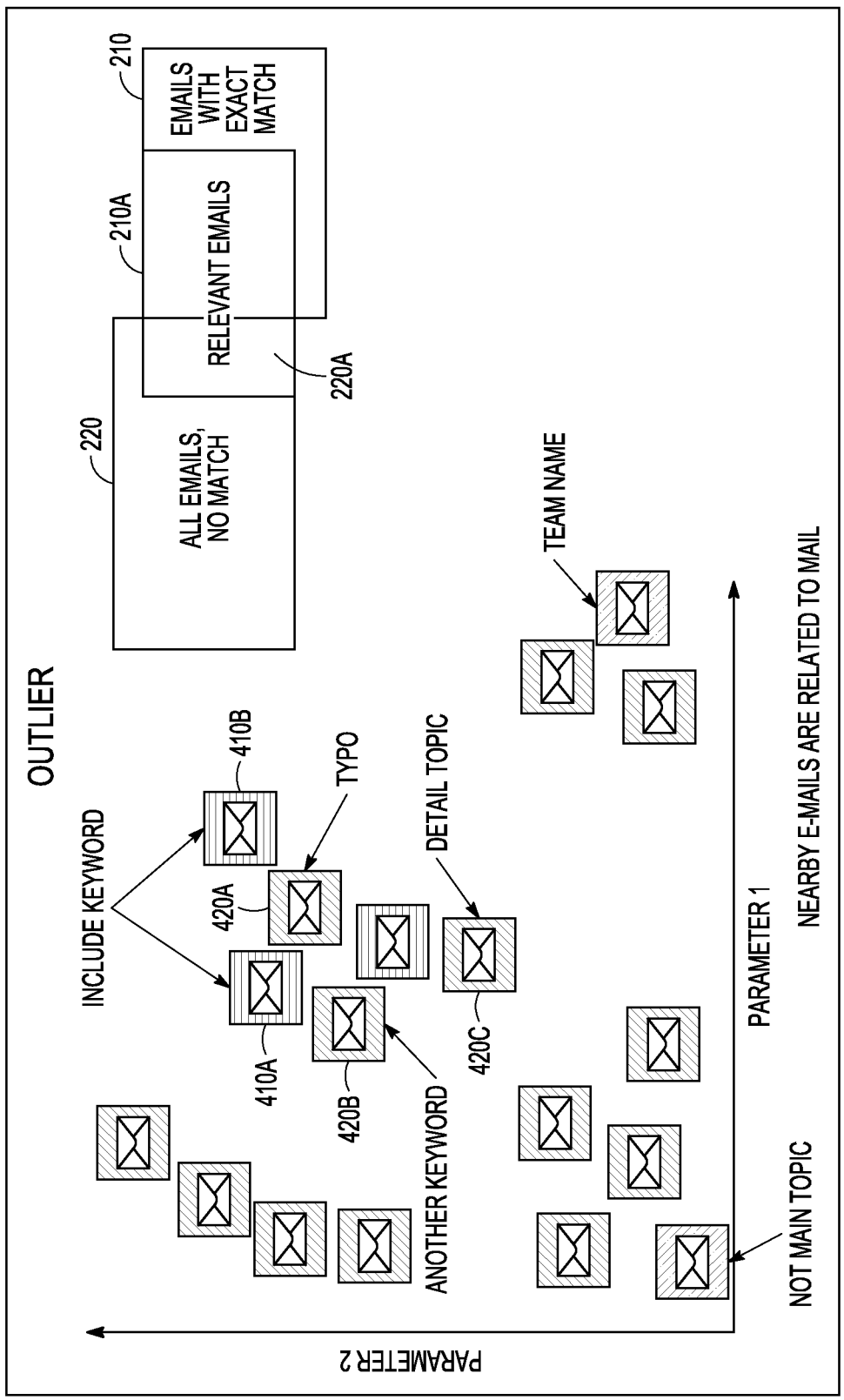
FIG. 4 illustrates a clustering of electronic communications.

At 340, the electronic communications are clustered as a function of the similarity measures. This is illustrated in FIG. 4, wherein electronic communications 410A and 410B include the keyword. A desire now is to include the electronic communications that are false negatives, such as electronic communications that are related to the project, but they were not detected by the keyword search. Keywords may not have been included, for example, because there was a typo of the keyword in the electronic communication, there was a use of a different project name, and there may have been a discussion of the project but without using the project name keyword, as indicated by 420A, 420B and 420C in FIG. 4.

Figure 5:
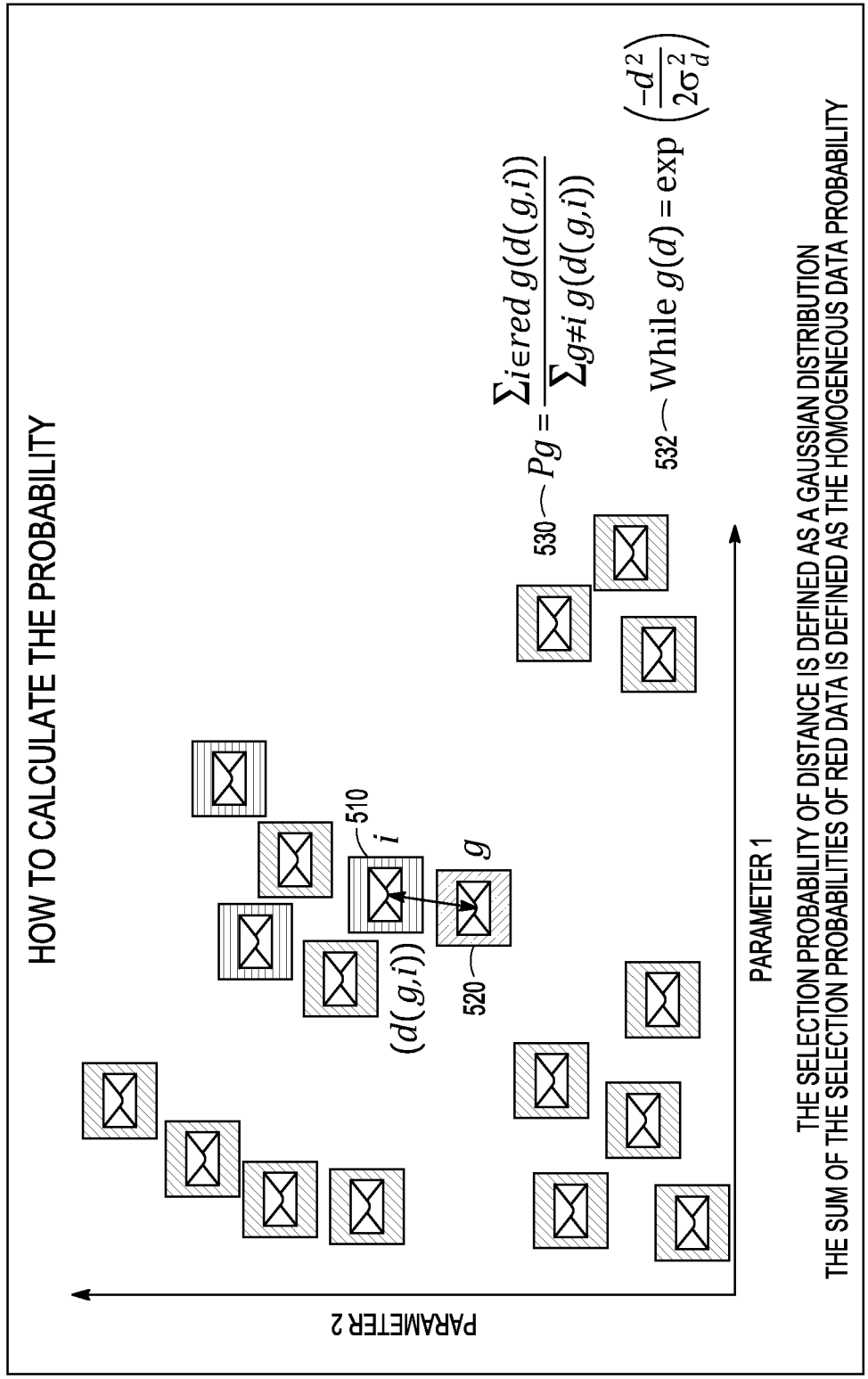
FIG. 5 illustrates a calculation of a probability of a classification of an electronic communication.

At 350, a false positive electronic communication is removed from a first cluster as a function of a sum of distances between the false positive electronic communication and electronic communications in the first cluster that include the keyword and a sum of distances between the false positive communication and electronic communications in the first cluster that do not include the keyword. This is illustrated in FIG. 5, as the distance between communication 510 and communication 520. It is further represented in FIG. 5 by equations 530 and 532. The process can also use an X-means process.

Figure 6:
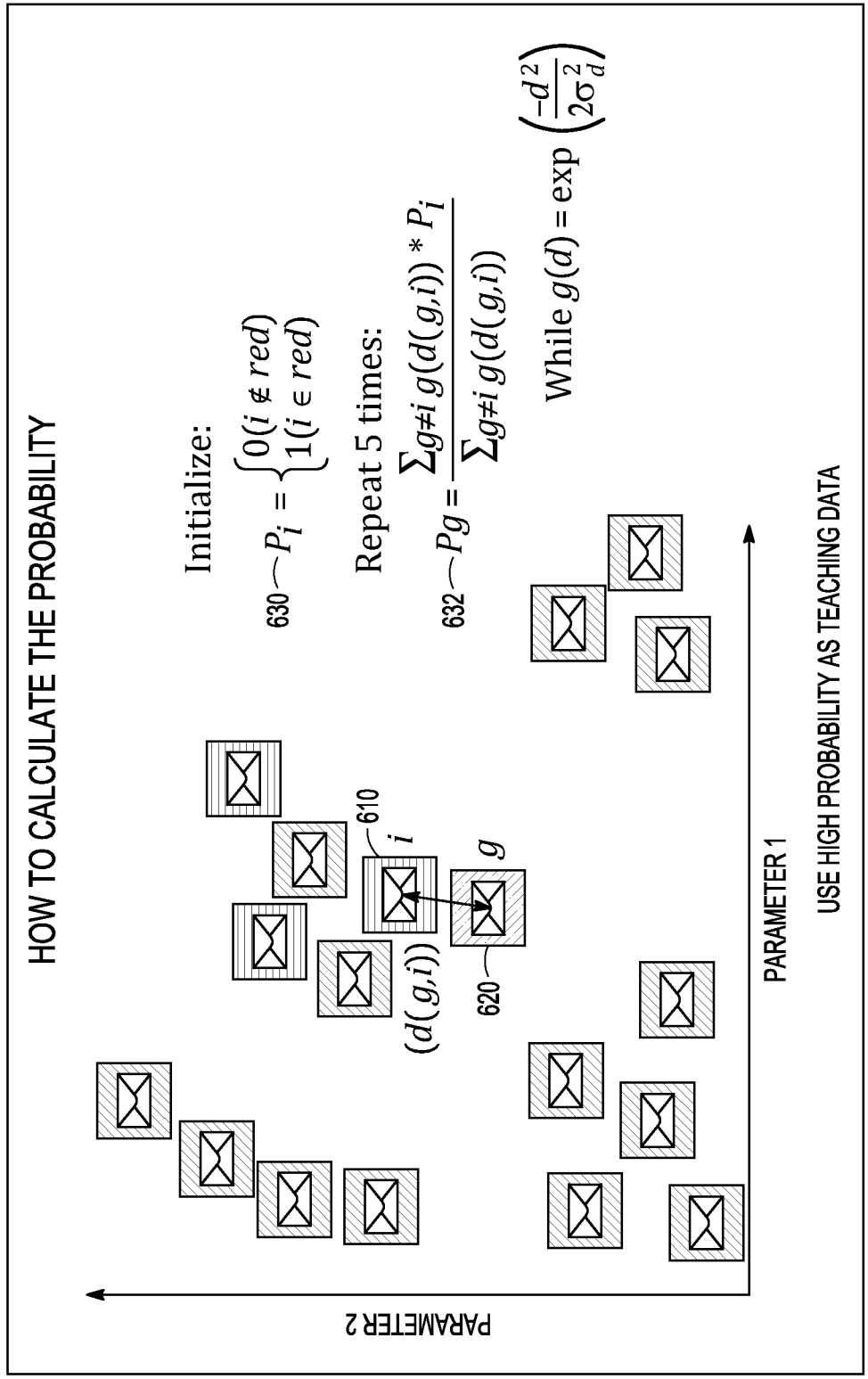
FIG. 6 illustrates a calculation of a probability of a classification of an electronic communication.

At 360, a false negative is added to the first cluster as a function of a sum of distances between the false negative and communications in the first cluster that include the keyword and the sum of distances between the false negative and communications in the cluster that do not include the keyword. This is illustrated in FIG. 6 as the distance between communications 610 and 620. These distances are multiplied by the probability $P_i$ that the electronic communication is associated with a given project, as indicated in Equation 632. In an embodiment, the probability $P_i$ is a conditional probability that is represented by a Gaussian function. This approach allows email classification without the need to use personal data for training. The value of $P_i$ is updated by a specific process to obtain the probability that each e-mail is associated with a project. As indicated in Equation 630, by default, the value of $P_i$ is set to 1 for electronic communications found by the keyword search, and it is set to 0 for other communications. In an embodiment, the values of 0.95 and 0.05 are used for label smoothing. This is then updated according to equation 632 to increase the probability of items that were not caught by the keyword search but are close in context.

Figure 7:
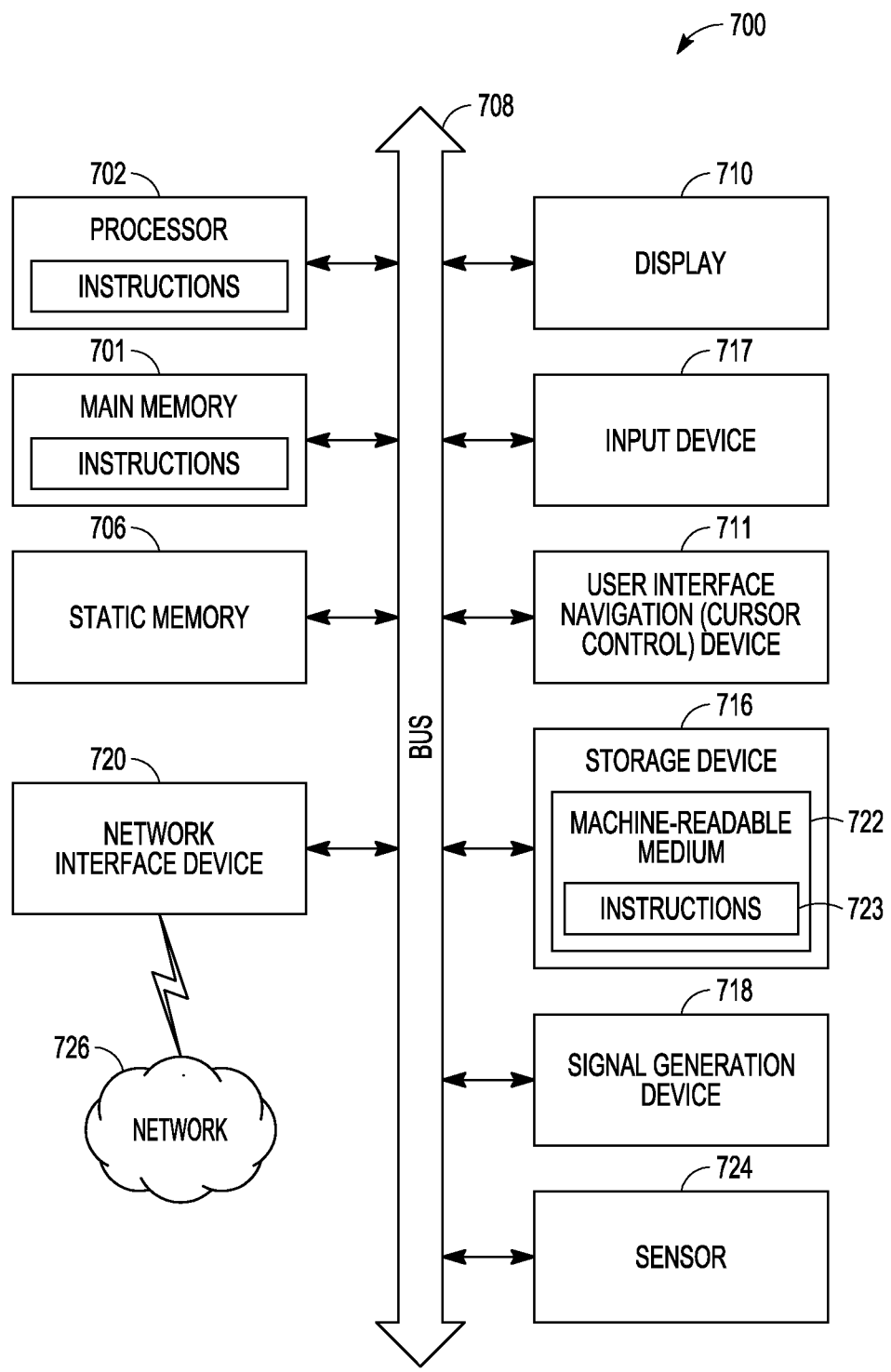
FIG. 7 is a block diagram of a computer architecture upon which one or more of the embodiments disclosed herein can execute.

FIG. 7 is a block diagram illustrating a computing and communications platform 700 in the example form of a general-purpose machine on which some or all the operations of FIG. 3 may be carried out according to various embodiments. In certain embodiments, programming of the computing platform 700 according to one or more particular algorithms produces a special-purpose machine upon execution of that programming. In a networked deployment, the computing platform 700 may operate in the capacity of either a server or a client machine in server-client network environments, or it may act as a peer machine in peer-to-peer (or distributed) network environments.

Example computing platform 700 includes at least one processor 702 (e.g., a central processing unit (CPU), a graphics processing unit (GPU) or both, processor cores, compute nodes, etc.), a main memory 701 and a static memory 706, which communicate with each other via a link 708 (e.g., bus). The computing platform 700 may further include a video display unit 710, input devices 717 (e.g., a keyboard, camera, microphone), and a user interface (UI) navigation device 711 (e.g., mouse, touchscreen). The computing platform 700 may additionally include a storage device 716 (e.g., a drive unit), a signal generation device 718 (e.g., a speaker), a sensor 724, and a network interface device 720 coupled to a network 726.

The storage device 716 includes a non-transitory machine-readable medium 722 on which is stored one or more sets of data structures and instructions 723 (e.g., software) embodying or utilized by any one or more of the methodologies or functions described herein. The instructions 723 may also reside, completely or at least partially, within the main memory 701, static memory 706, and/or within the processor 702 during execution thereof by the computing platform 700, with the main memory 701, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 723. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process comprising providing electronic communications to a machine learning algorithm; providing a keyword to the machine learning algorithm; receiving similarity measures from the machine learning algorithm, the similarity measures indicating a similarity between the electronic communications and the keyword; clustering the electronic communications as a function of the similarity measures; removing a false positive electronic communication from a first cluster as a function of a sum of distances between the false positive electronic communication and electronic communications in the first cluster that include the keyword and a sum of distances between the false positive communication and electronic communications in the first cluster that do not include the keyword; and adding a false negative to the first cluster as a function of a sum of distances between the false negative and communications in the first cluster that include the keyword and the sum of distances between the false negative and communications in the cluster that do not include the keyword.

Example No. 2 includes all the features of Example No. 1, and optionally includes a process wherein the machine learning algorithm is an untrained machine learning algorithm.

Example No. 3 includes all the features of Example Nos. 1-2, and optionally includes a process wherein the machine learning algorithm understands ambiguous language.

Example No. 4 includes all the features of Example Nos. 1-3, and optionally includes a process wherein the machine learning algorithm comprises a bidirectional encoder representations from transformers (BERT) model.

Example No. 5 includes all the features of Example Nos. 1-4, and optionally includes a process comprising storing a portion of the electronic communications provided to the machine learning algorithm in a first vector and storing the keyword provided to the machine learning algorithm in a second vector.

Example No. 6 includes all the features of Example Nos. 1-5, and optionally includes a process wherein the electronic communications comprise one or more of an email, a chat and a text.

Example No. 7 is a machine-readable medium comprising instructions that when executed by a processor execute a process comprising providing electronic communications to a machine learning algorithm; providing a keyword to the machine learning algorithm; receiving similarity measures from the machine learning algorithm, the similarity measures indicating a similarity between the electronic communications and the keyword; clustering the electronic communications as a function of the similarity measures; removing a false positive electronic communication from a first cluster as a function of a sum of distances between the false positive electronic communication and electronic communications in the first cluster that include the keyword and a sum of distances between the false positive communication and electronic communications in the first cluster that do not include the keyword; and adding a false negative to the first cluster as a function of a sum of distances between the false negative and communications in the first cluster that include the keyword and the sum of distances between the false negative and communications in the cluster that do not include the keyword.

Example No. 8 includes all the features of Example No. 7, and optionally includes a machine-readable medium wherein the machine learning algorithm is an untrained machine learning algorithm.

Example No. 9 includes all the features of Example Nos. 7-8, and optionally includes a machine-readable medium wherein the machine learning algorithm understands ambiguous language.

Example No. 10 includes all the features of Example Nos. 7-9, and optionally includes a machine-readable medium wherein the machine learning algorithm comprises a bidirectional encoder representations from transformers (BERT) model.

Example No. 11 includes all the features of Example Nos. 7-10, and optionally includes a machine-readable medium comprising instructions for storing a portion of the electronic communications provided to the machine learning algorithm in a first vector and storing the keyword provided to the machine learning algorithm in a second vector.

Example No. 12 includes all the features of Example Nos. 7-11, and optionally includes a machine-readable medium wherein the electronic communications comprise one or more of an email, a chat and a text.

Example No. 13 is a system comprising a computer processor; and a memory coupled to the computer processor; wherein the computer processor and memory are operable for providing electronic communications to a machine learning algorithm; providing a keyword to the machine learning algorithm; receiving similarity measures from the machine learning algorithm, the similarity measures indicating a similarity between the electronic communications and the keyword; clustering the electronic communications as a function of the similarity measures; removing a false positive electronic communication from a first cluster as a function of a sum of distances between the false positive electronic communication and electronic communications in the first cluster that include the keyword and a sum of distances between the false positive communication and electronic communications in the first cluster that do not include the keyword; and adding a false negative to the first cluster as a function of a sum of distances between the false negative and communications in the first cluster that include the keyword and the sum of distances between the false negative and communications in the cluster that do not include the keyword.

Example No. 14 includes all the features of Example No. 13, and optionally includes a system wherein the machine learning algorithm is an untrained machine learning algorithm.

Example No. 15 includes all the features of Example Nos. 13-14, and optionally includes a system wherein the machine learning algorithm understands ambiguous language.

Example No. 16 includes all the features of Example Nos. 13-15, and optionally includes a system wherein the machine learning algorithm comprises a bidirectional encoder representations from transformers (BERT) model.

Example No. 17 includes all the features of Example Nos. 13-16, and optionally includes a system wherein the system in operable for storing a portion of the electronic communications provided to the machine learning algorithm in a first vector and storing the keyword provided to the machine learning algorithm in a second vector.

Example No. 18 includes all the features of Example Nos. 13-17, and optionally includes a system wherein the electronic communications comprise one or more of an email, a chat and a text.

The invention claimed is:

1. A computerized process comprising:
providing electronic communications from a processor to a machine learning algorithm;
providing a keyword to the machine learning algorithm;
receiving similarity measures from the machine learning algorithm, the similarity measures indicating a similarity between the electronic communications and the keyword;
clustering the electronic communications as a function of the similarity measures;
removing a false positive electronic communication from a first cluster as a function of a sum of distances between the false positive electronic communication and electronic communications in the first cluster that include the keyword and a sum of distances between the false positive communication and electronic communications in the first cluster that do not include the keyword; and
adding a false negative to the first cluster as a function of a sum of distances between the false negative and communications in the first cluster that include the keyword and the sum of distances between the false negative and communications in the cluster that do not include the keyword.

2. The computerized process of claim 1, wherein the machine learning algorithm is an untrained machine learning algorithm.

3. The computerized process of claim 1, wherein the machine learning algorithm understands ambiguous language.

4. The computerized process of claim 1, wherein the machine learning algorithm comprises a bidirectional encoder representations from transformers (BERT) model.

5. The computerized process of claim 1, comprising storing a portion of the electronic communications provided to the machine learning algorithm in a first vector and storing the keyword provided to the machine learning algorithm in a second vector.

6. The computerized process of claim 1, wherein the electronic communications comprise one or more of an email, a chat and a text.

7. A non-transitory machine-readable medium comprising instructions that when executed by a processor execute a process comprising:

providing electronic communications from the processor to a machine learning algorithm;
providing a keyword to the machine learning algorithm;
receiving similarity measures from the machine learning algorithm, the similarity measures indicating a similarity between the electronic communications and the keyword;
clustering the electronic communications as a function of the similarity measures;
removing a false positive electronic communication from a first cluster as a function of a sum of distances between the false positive electronic communication and electronic communications in the first cluster that include the keyword and a sum of distances between the false positive communication and electronic communications in the first cluster that do not include the keyword; and
adding a false negative to the first cluster as a function of a sum of distances between the false negative and communications in the first cluster that include the keyword and the sum of distances between the false negative and communications in the cluster that do not include the keyword.

8. The non-transitory machine-readable medium of claim 7, wherein the machine learning algorithm is an untrained machine learning algorithm.

9. The non-transitory machine-readable medium of claim 7, wherein the machine learning algorithm understands ambiguous language.

10. The non-transitory machine-readable medium of claim 7, wherein the machine learning algorithm comprises a bidirectional encoder representations from transformers (BERT) model.

11. The non-transitory machine-readable medium of claim 7, comprising instructions for storing a portion of the electronic communications provided to the machine learning algorithm in a first vector and storing the keyword provided to the machine learning algorithm in a second vector.

12. The non-transitory machine-readable medium of claim 7, wherein the electronic communications comprise one or more of an email, a chat and a text.

13. A system comprising:
a computer processor; and
a memory coupled to the computer processor;
wherein the computer processor and memory are operable for:
providing electronic communications from the computer processor to a machine learning algorithm;
providing a keyword to the machine learning algorithm;
receiving similarity measures from the machine learning algorithm, the similarity measures indicating a similarity between the electronic communications and the keyword;
clustering the electronic communications as a function of the similarity measures;
removing a false positive electronic communication from a first cluster as a function of a sum of distances between the false positive electronic communication and electronic communications in the first cluster that include the keyword and a sum of distances between the false positive communication and electronic communications in the first cluster that do not include the keyword; and
adding a false negative to the first cluster as a function of a sum of distances between the false negative and communications in the first cluster that include the keyword and the sum of distances between the false negative and communications in the cluster that do not include the keyword.

14. The system of claim 13, wherein the machine learning algorithm is an untrained machine learning algorithm.

15. The system of claim 13, wherein the machine learning algorithm understands ambiguous language.

16. The system of claim 13, wherein the machine learning algorithm comprises a bidirectional encoder representations from transformers (BERT) model.

17. The system of claim 13, wherein the system in operable for storing a portion of the electronic communications provided to the machine learning algorithm in a first vector and storing the keyword provided to the machine learning algorithm in a second vector.

18. The system of claim 13, wherein the electronic communications comprise one or more of an email, a chat and a text.

* * * * *